United States Patent [19]

Schultz

[11] 4,402,723
[45] Sep. 6, 1983

[54] NOZZLE ARRANGEMENT FOR PASS-THROUGH GLASS SHEET TEMPERING APPARATUS

[75] Inventor: Stephen J. Schultz, Pittsburgh, Pa.

[73] Assignee: PPG Industries, Inc., Pittsburgh, Pa.

[21] Appl. No.: 343,655

[22] Filed: Jan. 28, 1982

[51] Int. Cl.³ .............................................. C03B 27/04
[52] U.S. Cl. ........................................ 65/114; 65/104; 65/115; 65/348; 65/351
[58] Field of Search ................. 65/351, 348, 115, 104, 65/114

[56] References Cited

U.S. PATENT DOCUMENTS

| | | | |
|---|---|---|---|
| 3,186,815 | 6/1965 | Jochim | 65/115 |
| 3,294,519 | 12/1966 | Fickes | 65/348 |
| 4,046,543 | 9/1977 | Shields | 65/25 A |
| 4,119,427 | 10/1978 | Revells | 65/159 |
| 4,139,359 | 2/1979 | Johnson et al. | 65/104 X |
| 4,282,026 | 8/1981 | McMaster | 65/273 |
| 4,314,836 | 2/1982 | Seymour | 65/114 |
| 4,323,385 | 4/1982 | Gintert et al. | 65/351 |

*Primary Examiner*—Arthur D. Kellogg
*Attorney, Agent, or Firm*—William D. West; Edward I. Mates

[57] ABSTRACT

Nozzles are arranged in different densities transverse to a path of travel for glass sheets moving through a pass-through quench to facilitate removal of spent tempering medium to both lateral sides of said path of travel.

15 Claims, 3 Drawing Figures

NOZZLE ARRANGEMENT FOR PASS-THROUGH GLASS SHEET TEMPERING APPARATUS

BACKGROUND OF THE INVENTION

1. Field of the Invention

The present invention relates to glass sheet tempering apparatus and particularly relates to the tempering of large glass sheets, especially those that are shaped prior to being tempered. When glass sheets are tempered, each glass sheet in turn is heated above its annealing range and then rapidly cooled to set the surfaces of the glass sheet while the center is still hot. This action results in the sheet having its surfaces stressed in compression while the intermediate portion is stressed in tension after its temperature equalizes throughout its thickness.

The stress pattern imparted to tempered glass results in a much stronger sheet than untempered glass, because the glass surfaces, by virtue of being stressed in compression, are much more able to withstand external forces than untempered glass sheets which are not provided with such large compression stresses in the surface area. Moreover, when the outer surface of the glass is penetrated, tempered glass breaks up into small, relatively harmless, smoothly surfaced particles. In contrast, annealed glass fractures more readily, and when fractured, breaks into relatively dangerous, large, jagged fragments.

The uniformity of the size of the shattered particles indicates the uniformity of temper of the glass. The smaller, smoother particles of shattered tempered glass are much safer than the jagged fragments of untempered glass.

More specifically, in a typical tempering operation, a glass sheet is heated to nearly its softening point and then quickly chilled by uniformly exposing the opposite surfaces of the heated glass sheet to cold streams of a tempering fluid, such as air, arranged to cool both surfaces uniformly and simultaneously. The fluid is disposed through two opposed, spaced plenum chambers via nozzle boxes, each provided with an apertured wall through which extend a set of nozzles. The sets of nozzles face opposite major surfaces of the glass sheet.

The prior art considered it a prerequisite to uniform tempering to have an even distribution of the cooling air over the glass surfaces. This is usually accomplished by blasting air through a plurality of identical, uniformly spaced, elongated nozzles extending through apertures in apertured walls of the plenum chambers or nozzle boxes. The nozzles and/or the glass sheets are either moved in closed orbits or reciprocated through an amplitude sufficient to insure that each increment of the glass sheet area is swept by at least one of the nozzles. This distance between the nozzle orifices and the adjacent sheet surfaces have been kept as uniform as possible in order to strive for the goal of uniform tempering of the glass sheet.

It is necessary to impart relative movement between the nozzles moving in unison relative to the glass sheet to avoid nonuniform cooling of the glass. When the nozzles are not moved relative to the major glass surfaces or vice versa, the tempering medium blasts are directed against fixed locations on the glass. Fixed air blasts cool the fixed locations opposite the blasts rapidly while other locations adjacent to the fixed locations are not cooled as rapidly. Without such relative movement, patterns of iridescence form on the surface of the tempered glass. These patterns of iridescence are very annoying when viewed in reflection or in polarized light.

By providing relative movement of the nozzles relative to the major surfaces of the glass sheet, and by applying the streams of air or other tempering medium through the nozzles by pressure from a common source, prior art tempering apparatus provided substantially uniform tempering for flat glass and gently curved glass of relatively small and intermediate sizes. However, as the size and/or shape of automobile backlights and sidelights became larger and more complicated, it has become more and more difficult to temper glass sheets adequately. It has become necessary to supply air or other tempering medium at a greater rate of flow per unit area for larger sizes than for smaller sizes in order to assure that the glass is adequately tempered.

The glass sheet tempering art has developed many techniques for imparting relative motion between the nozzles that face the opposite surfaces of the glass sheet and the major surfaces of said sheet. Some of these involve linear reciprocation of the nozzles in unison. Others involve linear reciprocating or translational movement of glass sheets past a pair of arrays of fixed opposing nozzles. Others involving applying elliptical or circular orbital movement of nozzles relative to a glass sheet supported at a fixed position.

The prior art recognized that one of the problems of inadequate tempering of large glass sheets and/or those having complicated curvatures resulted from the inability of the air blasted against the central portion of the glass sheet to escape from between the central portion of the glass sheet and the apertured walls of the plenum chambers or nozzle boxes so as to enable fresh cool tempering medium to replace the spent tempering medium that impinged on the glass. The prior art recognized the correlation of the long escape path from the center to the edge of the glass sheet with inadequate center portion temper. According to one proposal to solve this problem, the wall of each plenum chamber or nozzle box facing the central portion of a glass sheet undergoing cooling has a greater proportion per unit area apertured than the remainder of the wall facing the portion of the glass sheet surrounding the central portion. Such a construction causes a slight pressure gradient in the tempering medium along the major surfaces of the glass sheets undergoing cooling from the central region to the outermost regions of the glass sheet surfaces facing the opposing sets of moving nozzles through which tempering medium is applied for tempering. This slight pressure gradient results in a continuous outward flow from the central portion of the glass to its entire peripheral margin and helps remove air from the vicinity of the glass sheet surface after the relatively cool air supplied through the apertured wall of the plenum chamber has engaged the heated glass surface to chill the latter and has in turn been heated by said engagement.

In the past, relative movement between the glass sheets and the tempering nozzles involved either limited relative movement of the tempering nozzles in unison relative to a glass sheet supported in fixed position between the moving sets of nozzles or vice versa so that each glass sheet portion was cooled repetitively by one or more discrete blasts in a limited area or a so-called "pass-through" type of tempering apparatus in which hot glass sheets passed between fixed nozzles extending from opposed plenum chambers to direct different blasts of tempering medium, such as air, against each increment of each of the opposite major surfaces of the glass sheets that moved along a path of travel between the opposed sets of nozzles. It is obvious that glass sheets moving through a tempering apparatus along a path of movement provide a different problem from that encountered with a stationary glass sheet supported within an area of limited movement of a pair of opposed sets of tempering nozzles or that met in moving a glass sheet either orbitally or in a reciprocating path within an area defined by fixed nozzles. The solutions involved in providing for the escape of tempering medium after it is applied at cold temperature against the opposite hot glass sheet surfaces or targets that are held in stationary position between nozzles moving relative to the stationary targets or those which occupy repetitive positions relative to the nozzles do not solve the problem of promoting the escape of spent tempering medium applied against moving targets that occupy different positions during the cooling step of a tempering cycle.

It would be beneficial for the glass tempering art to develop a technique whereby tempering medium blasts applied at a cold temperature against the heat-softened surfaces of a continuously moving, hot glass sheet are permitted to flow and escape more readily than permitted in prior art devices in order to facilitate the application of additional cold tempering medium toward the opposite major glass sheet surfaces as the sheet moves through pass-through tempering apparatus to provide an adequate temper in the moving glass sheet.

2. Description of Patents of Interest

U.S. Pat. No. 3,186,815 to Jochim dicloses a glass tempering apparatus designed to temper different portions of the glass to different degrees of temper by providing a separate set of nozzles moveable relative to the remaining tempering nozzles in a direction parallel to the thickness of a stationary glass sheet being tempered. The purpose of this invention is to provide different portions of the tempered glass sheet with different properties that are associated with different degrees of temper.

U.S. Pat. No. 3,294,519 to Fickes discloses apparatus for tempering a stationary glass sheet in which air under pressure is supplied to a pair of opposed plenum chambers and imparted through nozzles having a larger proportion of tempering medium-imparting area per unit cross section area in the central portion compared to that of the portions exterior of the central portion. The purpose of this patent is to increase the flow rate of tempering medium against the central portion of the glass sheet undergoing tempering so as to cause a pressure gradient in the tempering medium parallel to the major surfaces of the glass sheet from the central region to the entire marginal portion of the stationary glass sheet.

U.S. Pat. No. 4,323,385 to Dean W. Gintert and Raymond W. Waksmunski, U.S. Pat. No. 4,314,836 to Samuel L. Seymour, German Pat. No. 1,808,117 to Tilmant and Japanese Patent Specification No. 26320/42 to Amano, all show apparatus for treating stationary glass sheets. The disclosures in the Gintert et al and German documents utilize two concentric areas of nozzles, an inner area of nozzles surrounded by an outer area of nozzles. The nozzles in the inner and outer areas are arranged differently from one another. The Seymour patent provides exhaust areas interposed between nozzles throughout the tempering apparatus to help air blasts to escape in directions parallel to the glass sheet thickness. In the Japanese disclosure, there are three concentric areas of nozzles in which large diameter nozzles are located in the intermediate area, the innermost area is provided with closely spaced small diameter nozzles, and the outermost area is provided with nozzles of intermediate diameter disposed in a different spacing from the nozzles in the other two areas.

U.S. Pat. No. 4,282,026 to McMaster et al discloses tempering apparatus in which a shaped glass sheet is supported on a ring-like mold between upper and lower blastheads that supply cooling air toward the opposite glass sheet surfaces. The carrier for the mold preferably oscillates back and forth between the blastheads to uniformly distribute the impingement of cooling air with the glass. No provision of non-uniform nozzle arrangement is made in this apparatus to facilitate the escape of spent air.

None of these patents disclose any apparatus for tempering glass sheets that move along a continuous path of movement past a succession of nozzles arranged in opposing sets that face the opposite major surfaces of the moving glass sheet that represents a moving target. In the prior art discussed thus far, the glass sheet did not move continuously through a tempering apparatus without stopping. Stopping for the type of tempering provided by the patents mentioned previously reduces the maximum rate of tempered glass sheet production, as it is necessary for consecutive sheets being heated along a conveyor passing through a tunnel-type furnace to wait until a glass sheet is cooled sufficiently at a cooling station before the glass sheet can be released from the cooling station and replaced by a succeeding glass sheet in a series of glass sheets for cooling of the succeeding glass sheet at a rate rapid enough to cause it to develop a temper.

U.S. Pat. No. 4,046,543 to George B. Shields discloses a glass sheet tempering apparatus of the pass-through type comprising slot-type nozzles and means to provide escape paths for spent tempering medium provided in this patent that are different from those provided in the present invention. This patent also provides screens of non-uniform porosity designed to deliver tempering medium at more uniform flow across the width of the path of glass sheet travel.

U.S. Pat. No. 4,119,427 to Revells discloses tempering apparatus of the pass-through type. This apparatus includes cooling means comprising upper and lower blastheads disposed above and below the path of glass sheet travel. Series of tubes arranged in longitudinally spaced sets disposed across the width of the path of glass sheet travel extend from the blastheads to direct opposing streams of cooling fluid toward the opposite surfaces of the moving glass sheets.

The escape paths for spent cooling fluid provided in the Revells patent are similar to those of the Shields patent and comprise open spaces extending transversely across the entire width of the tempering apparatus alternating with sets of nozzles along the length of the path of glass sheet travel. The nozzles are elongated slots in the Shields patented apparatus and of pipe-like construction in the Revells patented apparatus.

To the best of our knowledge, the pass-through type of tempering apparatus of the latter Shields or Revells patents were not constructed to facilitate the escape of spent tempering medium from the center to the sides of the path of glass sheet travel along the major surfaces of the glass sheet. A search of prior art failed to discover pass-through tempering apparatus specially constructed to permit additional cool tempering medium to be applied more readily against the opposite major surfaces of the hot glass sheet, particularly toward its central portion transverse to the path of travel.

SUMMARY OF THE INVENTION

It has now been found that glass sheets can be tempered substantially uniformly throughout their entire extent while traversing a pass-through tempering apparatus without stopping by utilizing plenum chambers or nozzle boxes having apertured walls of novel construction facing the opposite major surfaces of the glass sheet. Specifically, the walls of the nozzle boxes of this invention have apertures arranged in a particular transverse configuration that do not change appreciably from increment to increment along a path of glass sheet travel along the entire length of the tempering apparatus. In a preferred embodiment, the apertures in the facing walls of the nozzle boxes associated with opposite plenum chambers are arranged so that the apertures facing the transverse central portion of the path are relatively more closely bunched transverse to the path of glass sheet travel, the apertures facing the transverse side portions of the path of glass sheet travel are relatively sparcely bunched, and the apertures facing the intermediate portions transverse to the path of glass sheet travel are more sparsely bunched transverse to the path of glass sheet movement than the apertures facing the central portion and more closely bunched than the apertures facing the transverse side portions.

This construction facilitates transverse movement of spent tempering medium from the center to both lateral sides of the path of glass sheet travel as the glass moves through the tempering apparatus. Consequently, blasts of cool tempering medium applied downstream of the first applied blasts have less resistance in their movement toward the glass surfaces than if the apparatus were not provided with the means to facilitate sidewise escape of spent tempering medium along the major glass sheet surfaces.

While the apertured walls of the embodiments of this invention may be flat and parallel to one another and spaced apart a sufficient distance to enable a flat sheet of glass to pass therebetween for cooling, it is also understood that the walls may be curved to conform to the shape of the glass sheet undergoing cooling during the tempering process and/or that the nozzles may extend different distances from the walls so that the ends of the nozzles lie in curved surfaces approximately parallel to and approximately uniformly spaced from the adjacent major surfaces of shaped glass sheet undergoing tempering.

These and other characteristics of the present invention will be understood in the light of the description of certain preferred embodiments thereof which follows.

BRIEF DESCRIPTION OF THE DRAWINGS

In the drawings that form part of the description of the present invention and wherein like reference numbers refer to like structural elements.

DESCRIPTION OF A PREFERRED EMBODIMENT

Figure 1:
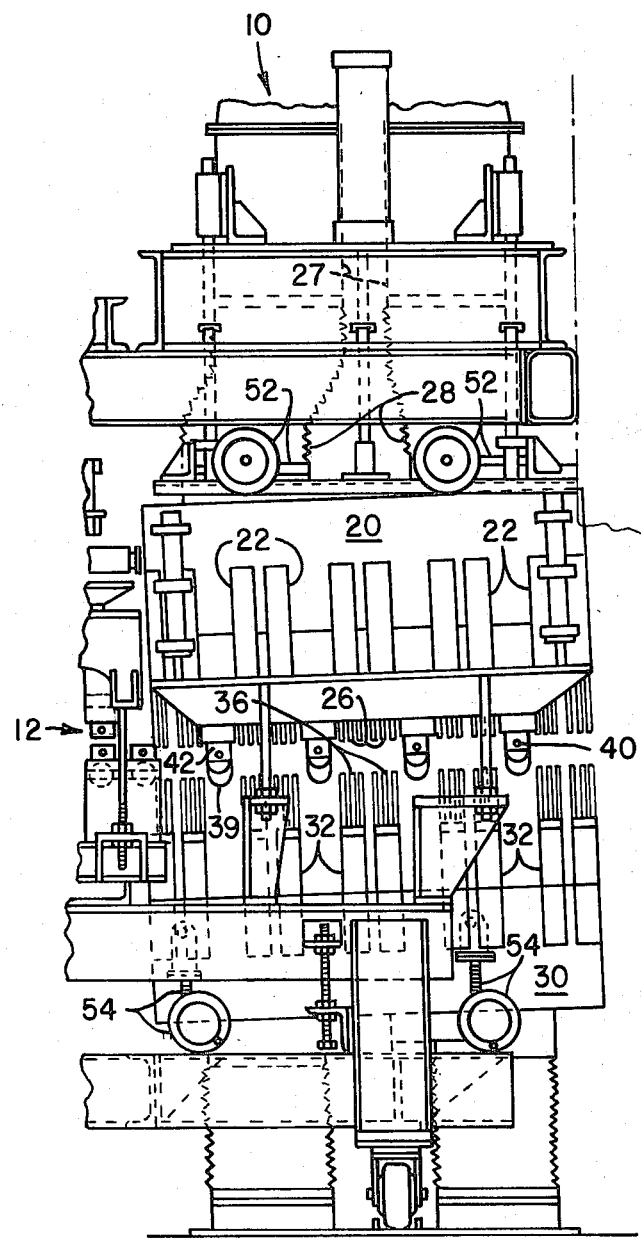
FIG. 1 is a side assembly view, with certain structures omitted to show pertinent features of a specific embodiment of glass sheet tempering apparatus conforming to the present invention.
Figure 2:
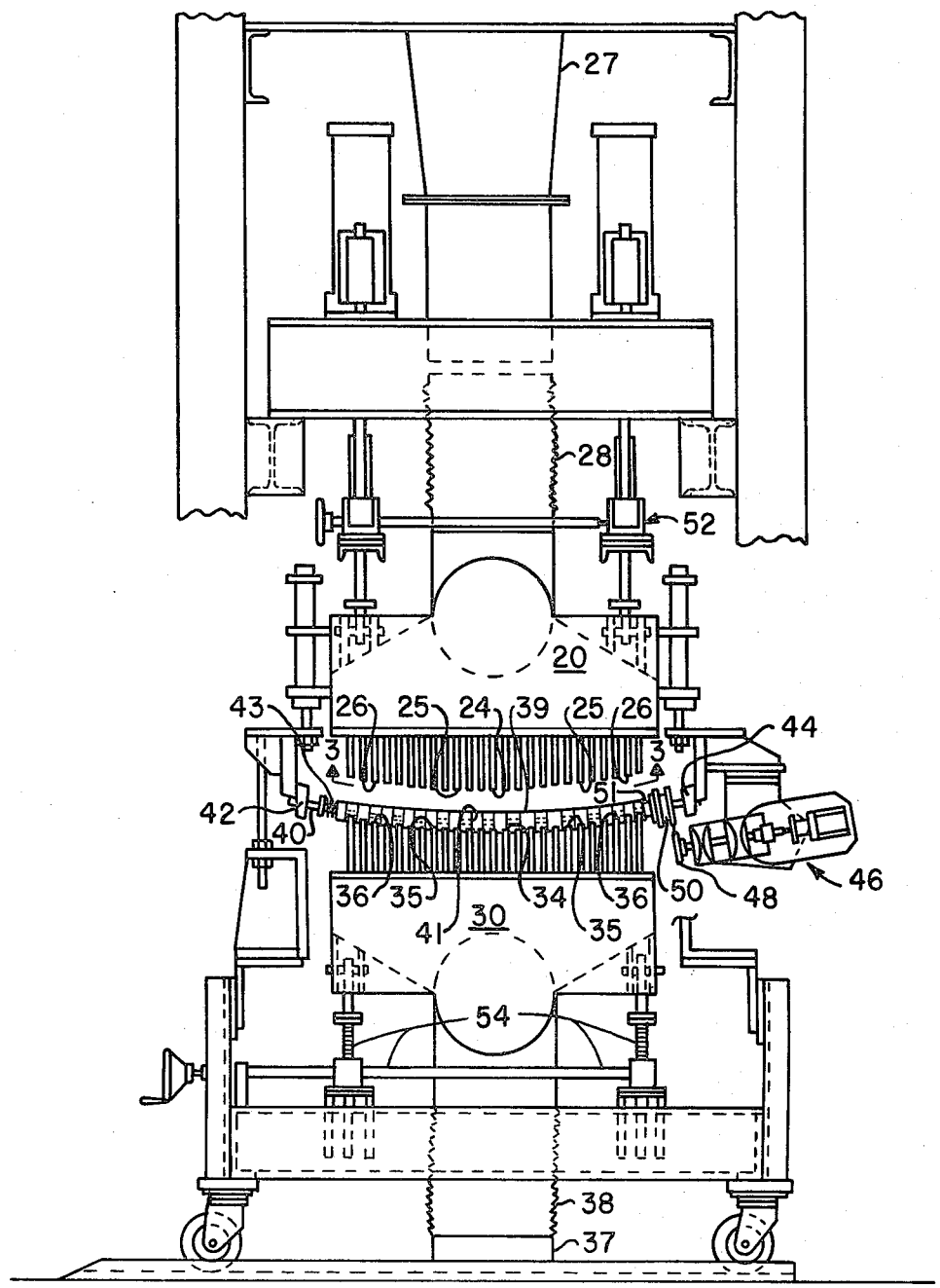
FIG. 2 is a transverse end view of the tempering apparatus of FIG. 1, for tempering certain curved glass sheets, comprising nozzle boxes having apertured walls and provided with nozzles constructed and arranged to extend from said apertured walls according to the present invention.

In the preferred embodiment to be described, a tempering apparatus 10 is shown immediately downstream of the downstream exit portion of apparatus 12 for shaping glass sheets of the roll forming type, which is immediately downstream of a tunnel-type furnace (not shown). It is understood, however, that the tempering apparatus of the present invention may be used either in combination with any one of several different types of glass sheet shaping apparatus other than the roll forming type, if so desired, or may be constructed and arranged for use in tempering flat glass sheets. In the latter case, the tempering apparatus and the funnel-type furnace are the parts of a glass sheet tempering apparatus from which the shaping apparatus is omitted.

Referring to the drawings, an upper plenum chamber 20 is shown feeding a plurality of upper, transversely extending nozzle boxes 22 that are spaced from one another longitudinally of a path of glass sheet travel. Each upper nozzle box 22 comprises apertures that receive a plurality of sets of upper nozzles arranged in offset rows. The upper nozzles extend downwardly from the upper nozzle boxes 22. Each row includes central portion upper nozzles 24 that face the central transverse portion 124 of the path of glass sheet travel through the tempering station of the apparatus conforming to the present invention, intermediate portion upper nozzles 25 that extend from the upper nozzle boxes 22 in the portions flanking the central portion to face intermediate portions 125 of the path of glass sheet travel, and side portion upper nozzles 26 that extend from the upper nozzle boxes 22 in a downward direction to face side portions 126 of the path of travel taken by glass sheets through the tempering apparatus 10. The upper plenum chamber 20 is fed from a source of pressurized air (not shown) through upper conduits 27 and upper flexible couplings 29.

A lower plenum chamber 30 communicates with a plurality of lower, transversely extending and longitudinally spaced nozzle boxes 32. Each of the lower nozzle boxes comprises apertures that receive a plurality of sets of lower nozzles. Each set of lower nozzles comprises a plurality of offset rows. The sets of lower nozzles extend upward from each of the lower nozzle boxes 32. These lower nozzles include central portion lower nozzles 34 which extend upwardly from each of the lower nozzle boxes 32 toward the central transverse portion 124 of the path of travel taken by glass sheets through the tempering apparatus of the present invention, intermediate portion lower nozzles 35 which face the transverse intermediate portions 125 of the path of glass sheet travel through the tempering apparatus that flank the central portion of the path of glass sheet travel, and side portion lower nozzles 36 which extend upwardly from the side portions of each of the lower nozzle boxes 32 to face the transverse side portions 126 of the path of travel taken by glass sheets through the tempering apparatus. Each set of nozzles receives tempering medium under pressure from a common plenum chamber, which serves as a pressurized source of tempering medium.

The glass sheets are conveyed on a series of shaped support rolls 39. Each of these rolls comprises a central shaft 40 around which are mounted loose interfitting segments 41 which are spring loaded by springs 43 in order to compress the space between the interfitting segments 41. The transverse ends of the shaft 40 are supported by support brackets 42 and 44.

A motor drive 46 provided with a sprocket 48 drives one of the sprockets on a double sprocket housing 50. The latter is fixed to a collar 51 coupled to an end segment 40 and imparts a rotational motion to the interfitting segments 41 mounted around one of the curved shafts 40. The double sprockets 50 are interconnected to be driven in unison to rotate the shaped support rolls 39 in unison about the curved shafts 40. In this way, shaped glass sheets supported on the shaped support rolls 39 are able to traverse the tempering apparatus of the present invention without harm to the supported undersurface of the glass sheets undergoing treatment. The shaped support rolls 39 are preferably of the type depicted in U.S. Pat. No. 4,311,509 of William D. Reader and Terry L. Wolfe.

Each of the upper nozzle boxes 22 and the lower nozzle boxes 32 extend transversely across the entire width of and transverse to the path of glass sheet travel. The nozzle boxes 22 and 32 oppose one another in vertical alignment and each comprise three transversely spaced rows of nozzles (although this number may be varied as desired). The individual nozzles of each row are transversely spaced relative to the nozzles in adjacent rows to form a trapezoidal area of pipe-type nozzles for each nozzle box. The nozzle boxes are mounted in closely spaced pairs and the pairs are spaced a sufficient distance longitudinally of the path of glass sheet travel to support the shaped support rolls 39 between adjacent pairs. The shaped support rolls 39 rotate in unison to convey the shaped glass sheets horizontally along an essentially horizontal path of travel through the tempering apparatus.

Elevator means 52 is provided for raising and lowering the upstream and downstream portions of the upper plenum chamber 20. Likewise, elevator means 54 is provided for raising and lowering the upstream and downstream portions of the lower plenum chamber 30. When the plenum chambers are separated, ready access is provided to the parts of the tempering apparatus when needed. The elevators means 52 and 54 are capable of tilting the plenum chambers as well as raising and lowering the latter in case such adjustment is desired.

The nozzles are mounted to extend from the nozzle boxes so that their free ends, that is, the lower ends of the upper nozzles 24, 25 and 26 and the upper ends of the lower nozzles 34, 35 and 36, terminate in curved surfaces approximating the curvature of glass sheets to be treated by the tempering apparatus. The apparatus for handling glass sheets is curved to a range of curvatures having radial curvature from 40 inches (101.6 centimeters) to approximately 75 inches (190.5 centimeters). The arcs defined by the ends of the nozzles are arranged about circles each having a radius of curvature of 60 inches (152.4 centimeters). This radius of curvature is used with shaped support rolls 39 having the ranges of curvatures previously mentioned.

Figure 3:
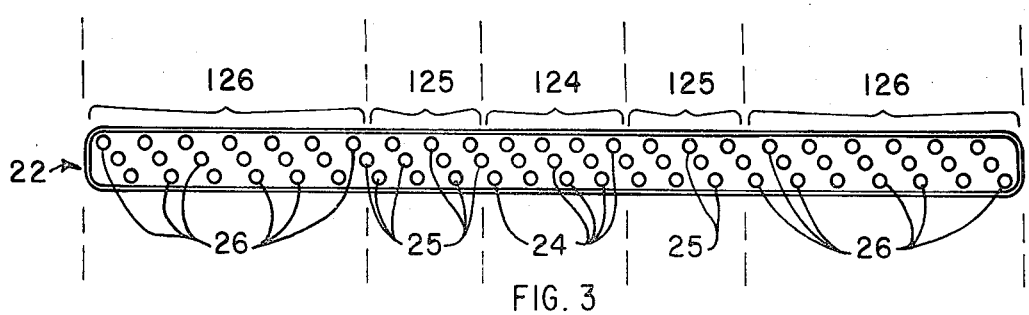
FIG. 3 is a plan view of one of a plurality of nozzle boxes, showing in detail the arrangement of apertures and nozzles, and taken along the arcuate line 3—3 of FIG. 2.

The central upper nozzles 24 and the central lower nozzles 34 face the transverse central portion 124 of the path of glass sheet movement. The intermediate portion upper nozzles 25 and the intermediate portion lower nozzles 35 face intermediate portions 125 which immediately flank the central portion 124 along the path of glass sheet movement. The side portion upper nozzles 26 and the side portion lower nozzles 36 face the transverse side portions 126 which flank the transverse intermediate portions 125 as depicted in FIG. 3. The transverse portions 124, 125 and 126 extend throughout the entire length of the tempering apparatus according to the present invention.

Therefore, with upper plenum chamber 20 and lower plenum chamber 30 providing pressurized tempering medium toward the upper nozzle boxes 22 and the lower nozzle boxes 32, respectively, the blasts of tempering medium applied to the upper and lower surfaces of glass sheets moving through the tempering apparatus in a forward direction are provided with transversely extending components of pressure differential that cause the spent tempering medium to move transversely outward or sidewise from the central portion of the path of glass sheet travel.

More specifically, the closer spacing between apertures supporting the nozzles extending to face the central transverse portion 124 of the path of glass sheet movement compared to the spacing between the apertures supporting nozzles extending to face the intermediate transverse portions 125 assures a transverse flow of tempering medium from the central portion of the glass sheet toward the intermediate transverse portions. Likewise, the more sparse spacing between the openings supporting the nozzles facing the transverse side portions 126 of the path of glass sheet movement than that of the intermediate nozzles insures that blasts of tempering medium imparted against the opposite major surfaces of the moving glass sheet escape in opposite direction to the opposite sides of the path of glass sheet travel.

This arrangement provides a means for removing spent air that has performed its task of chilling the opposite major surfaces of the moving glass sheets to escape from between the nozzle boxes of the tempering apparatus and the glass sheet surfaces in directions transverse to the path of glass sheet movement. In this way, the additional cold air that is imparted toward the upper and lower surfaces of the constantly moving glass sheets is free to move toward the opposite major surfaces thereof.

In a specific embodiment of tempering apparatus, where the intermediate nozzles 25 and 35 had a concentration of 100 percent facing the intermediate transverse portions 125 of the path of glass sheet travel along the entire length of the tempering apparatus, the centrally disposed nozzles 24 and 34 facing the central transverse portion 124 of the path of glass sheet had a concentration of 108 percent relative to the intermediate transverse portions 125 and the side portion nozzles 26 and 36 facing the transverse side portions 126 of the path of glass sheet travel had a concentration of 92 percent relative to the intermediate transverse portions 125, and each plenum chamber fed all the nozzles in each set of nozzle boxes with a common pressure for that plenum chamber, even though top and bottom plenum chambers opposing one another were fed either the same or slightly different pressures of tempering medium, satisfactory tempering results were obtained.

In the illustrative embodiment of this invention, the center transverse portion 124 faced by the closer spaced nozzles 24 and 34 occupied about 1/6 of the width of the path of glass sheet travel as defined by the transverse chord lengths of the support rolls 39. Each of the intermediate transverse portions 125 faced by the nozzles 25 and 35 of intermediate spacing occupied about ⅛ of the width of the path of glass sheet travel. The transverse side portions 126 faced by the sparsely spaced nozzles 26 and 36 shared the remaining width of the path of glass sheet travel.

It is understood that while the illustrative embodiment described had nozzles arranged in different densities to face five transverse portions of the path of glass sheet travel, the number may be increased or decreased as long as the concentration of nozzles fed from common nozzle boxes receiving pressurized tempering medium from a common plenum chamber decreases from the transverse center portion to the transverse side portion facing the path of glass sheet travel. The nozzle concentration may be in steps or may change gradually from the center portion to each side portion without departing from the gist of this invention.

A suitable range of differences in concentration of nozzles is for the central nozzles to have a concentration ten percent greater than that of the transverse side nozzles for treating glass sheets of narrow width, up to about 16 inches (40 millimeters), to as much as 30 percent greater concentration difference for treating glass sheets more than 30 inches (76 centimeters) wide. The difference in concentration increases with an increase of glass sheet width, but should not be so great as to develop temper stress patterns that depart too greatly from desired uniformity of temper.

It is understood that while the description of the preferred illustrative embodiment of the present invention has been described in terms of tempering apparatus that uses shaped conveyor rolls to convey glass sheets in an essentially horizontal plane during the tempering operation, it is understood that the tempering apparatus of the present invention can be modified to handle glass sheets that are either flat or curved and supported in other orientations, particularly in oblique or in essentially vertical orientations, or to handle glass sheets supported in essentially upright orientations by support means, such as tongs and other balancing devices.

The description of preferred illustrative embodiments has been for the purpose of illustration rather than limitation. The dimensions and operating conditions recited are included for the description of the illustrative embodiments and are subject to change without departing from the gist of this invention. It is understood that various other changes well known in the glass tempering art may be made depending upon the shape of glass sheet to be handled without departing from the gist of the invention as defined in the claimed subject matter that follows.

I claim:

1. Apparatus for tempering glass sheets comprising:
   a first and a second array of nozzles for directing streams of tempering medium toward a glass sheet wherein the nozzles of said first array are spaced from and directed toward the nozzles of said second array;
   means to convey a glass sheet along a continuous unidirectional movement path between said first and said second array of nozzles wherein the situs of the nozzles is defined by said movement path having a center and an edge area; and
   wherein the relative spacing between nozzles in both first and second arrays in a transverse direction to said movement path decreases toward said center area and increases toward said edge area.

2. Apparatus as in claim 1 wherein said first and said second array of nozzles are arranged in nozzle boxes having zones of evenly spaced nozzles within said zones such that the centermost zone to said movement path is characterized by nozzles having relatively closest spacing to each other, an intermediate zone of nozzles having intermediate relative spacing to each other and an edge zone having relatively most widely spaced nozzles.

3. Apparatus as in claim 1, wherein said means to convey comprises a plurality of support rolls arranged in longitudinally spaced relation along said path of glass sheet travel and extending transversely thereof, and said nozzles are constructed and arranged to direct tempering medium toward said path of glass sheet travel from opposite sides of said rolls.

4. Apparatus as in claim 3, wherein said support rolls are supported on axes extending approximately horizontally to define said path of glass sheet travel.

5. Apparatus as in claim 4, wherein said rolls are shaped along their longitudinal length to support and convey glass sheets that are curved in elevation transverse to said path of glass sheet travel along a surface curved transversely in elevation.

6. Apparatus as in claim 5, wherein said sets of nozzle boxes comprise an upper set having nozzles extending downwardly therefrom and a lower set having nozzles extending upwardly therefrom, the nozzles extending from said upper set terminating in a surface curved transversely in elevation spaced above and conforming approximately to said surface along which said curved rolls are deployed and the nozzles extending from said lower set terminating in a surface curved transversely in elevation spaced below and conforming approximately to said surface along which said curved rolls are deployed.

7. Apparatus as in claim 3 or 4 or 5 or 6, wherein said rolls are longitudinally offset with respect to said sets of nozzle boxes.

8. A method of imparting at least a partial temper to a glass sheet heated to an elevated temperature range sufficient for tempering comprising:
   continuously moving said glass sheet in a unidirectional path while at said elevated temperature range through a cooling zone;
   applying a plurality of flows of cold tempering medium from opposite sets of nozzles extending toward the opposite surfaces of said glass sheet as said glass sheet passes between said sets of nozzles characterized by applying a greater density of flows of cold tempering medium toward the central portion of said glass sheet, a lesser density of flows from cold tempering medium toward the transverse side portions of said glass sheet and intermediate density of flows of cold tempering medium against the transverse portions of said glass sheet intermediate said central portion and said transverse side portions as said sheet is conveyed along a longitudinal path of glass sheet travel between said sets in a longitudinal direction thereof without stopping.

9. A method as in claim 8, wherein said glass sheet is one of a series of glass sheets that move along said path of travel without stopping.

10. A method as in claim 8 or 9, wherein said path of glass sheet travel is essentially horizontal.

11. A method as in claim 10, wherein said path of glass sheet travel is straight.

12. A method as in claim 10, wherein said path of glass sheet travel is arcuate.

13. A method as in claim 8 or 9, wherein said glass sheet or sheets is or are curved in elevation transverse to said path of glass sheet travel.

14. A method as in claim 13, wherein said flows of cold tempering medium are directed toward the opposite major surfaces of said curved glass sheet or sheets from sets of nozzles arranged to have their free ends located in transversely curved surfaces conforming approximately to the transverse elevational curvature of said curved glass sheet or sheets.

15. A method as in claim 8, wherein the flows applied through the nozzles of any one set are derived from a pressure source common to said any one set.

* * * * *